United States Patent
Hong

(10) Patent No.: US 10,681,673 B2
(45) Date of Patent: Jun. 9, 2020

(54) METHODS FOR CONTROLLING A PAGING OPERATION AND APPARATUSES THEREOF

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/556,800

(22) Filed: Aug. 30, 2019

(65) Prior Publication Data

US 2020/0084747 A1   Mar. 12, 2020

(30) Foreign Application Priority Data

Sep. 6, 2018  (KR) .......... 10-2018-0106568
Jul. 11, 2019  (KR) .......... 10-2019-0083662

(51) Int. Cl.
*H04W 68/02*   (2009.01)
*H04W 72/04*   (2009.01)
*H04W 24/08*   (2009.01)
*H04W 76/28*   (2018.01)

(52) U.S. Cl.
CPC .......... *H04W 68/02* (2013.01); *H04W 24/08* (2013.01); *H04W 72/042* (2013.01); *H04W 72/0453* (2013.01); *H04W 76/28* (2018.02)

(58) Field of Classification Search
CPC . H04W 68/02; H04W 76/28; H04W 72/0453; H04W 24/08; H04W 72/042
See application file for complete search history.

(56) References Cited

U.S. PATENT DOCUMENTS

| | | | |
|---|---|---|---|
| 10,231,208 B2 * | 3/2019 | Agiwal | H04B 7/0695 |
| 2011/0134774 A1 * | 6/2011 | Pelletier | H04W 52/365 |
| | | | 370/252 |
| 2012/0300655 A1 * | 11/2012 | Lee | H04W 24/00 |
| | | | 370/252 |
| 2013/0215809 A1 * | 8/2013 | Chang | H04W 52/0235 |
| | | | 370/311 |
| 2013/0308533 A1 * | 11/2013 | Murakami | H04W 52/0216 |
| | | | 370/328 |
| 2018/0192436 A1 * | 7/2018 | Yi | H04W 72/14 |
| 2019/0223150 A1 * | 7/2019 | Islam | H04L 5/0048 |
| 2019/0281580 A1 * | 9/2019 | Rune | H04W 68/005 |

* cited by examiner

*Primary Examiner* — Nizar N Sivji
(74) *Attorney, Agent, or Firm* — IP Legal Services, LLC

(57) ABSTRACT

Provided are a method and apparatus for enabling a user equipment to perform a paging operation. The method includes: monitoring whether a paging message is present at a set of PDCCH monitoring occasions included in a paging occasion, detecting whether a base station has accessed to a channel including a frequency band over which the paging message is transmitted at one or more of the PDCCH monitoring occasions, and stopping the monitoring when detecting that the base station has accessed the channel.

13 Claims, 16 Drawing Sheets

US 10,681,673 B2

METHODS FOR CONTROLLING A PAGING OPERATION AND APPARATUSES THEREOF

CROSS-REFERENCE TO RELATED APPLICATION

This application claims the priority benefit of Korean Patent Application No. 10-2018-0106568, filed on Sep. 6, 2018 and No. 10-2019-0083662, filed on Jul. 11, 2019 in the Korean Intellectual Property Office, the disclosures of which are incorporated herein by reference in their entirety.

BACKGROUND

1. Technical Field

The present disclosure relates to methods and apparatuses for controlling a paging operation.

2. Description of the Related Art

With increasing use of mobile handsets, smartphones, tablets, or the like and various applications of wireless communication devices, the amount of data transmission and reception using wireless communication technology has abruptly increased. As low latency has recently emerged as an important issue, the next generation wireless communication technology (New RAT) has been introduced and advanced after the LTE technology.

Meanwhile, technologies for providing wireless communication services using an unlicensed band have been introduced. The unlicensed band is different from a licensed band that is exclusively used by a designated service operator. In particular, since a short-range wireless communication protocol is used together in the unlicensed band, various technologies have been introduced for co-existence of a mobile communication protocol and the short-range wireless communication protocol etc. From this point of view, the typical mobile communication technology uses the unlicensed band as an auxiliary cell while a corresponding communication service is provided to users. However, studies have been conducted on technologies for providing wireless communication services using only an unlicensed band itself.

A paging technology enables a user equipment and a base station to perform communication while reducing power consumption of the UE. To this end, the user equipment checks whether the base station has data to be transmitted to the user equipment at regular intervals.

However, there is no guarantee to occupy the unlicensed band when it needs. That is, although the user equipment monitors a paging message at a paging period, the user equipment may be unable to transmit the paging message at the paging period if the base station does not occupy the unlicensed band at the corresponding paging period. Accordingly, the user equipment may consume power unnecessarily.

Such a problem may be eliminated by allowing a user equipment to have more opportunities (e.g., occasions) for monitoring a paging message and extending each time period of monitoring a paging message. However, it will not prevent the user equipment from consuming power unnecessarily when the user equipment does not have a paging message to transmit.

SUMMARY

It is at least one object of present disclosure to provide a paging operation technology for performing a paging operation efficiently with power consumption reduced.

In accordance with one aspect of the present disclosure, a method of a user equipment is provided for performing a paging operation. The method includes: monitoring whether a paging message is present at a set of PDCCH monitoring occasions included in a paging occasion, detecting whether a base station has accessed to a channel including a frequency band over which the paging message is transmitted at one or more of the PDCCH monitoring occasions, and when it is detected that the base station has accessed the channel, stopping the monitoring for whether the paging message at the set of PDCCH monitoring occasions is present.

In accordance with another aspect of the present disclosure, a method of a base station is provided for controlling a paging operation of a user equipment. The method includes: transmitting extended PDCCH monitoring occasion indication information to the user equipment, and transmitting a reference signal or a PDCCH at a set of PDCCH monitoring occasions included in a paging occasion, which is configured using the extended PDCCH monitoring occasion indication information. Wherein, the user equipment monitors whether a paging message is present at one or more of the PDCCH monitoring occasions and stops the monitoring for whether the paging message is present when the reference signal or the PDCCH is detected.

In accordance with further another aspect of the present disclosure, a user equipment is provided for performing a paging operation. The user equipment includes: a receiver receiving extended PDCCH monitoring occasion indication information, and a controller monitoring whether a paging message is present at a set of PDCCH monitoring occasions included in a paging occasion and, when it is detected that a base station has accessed to a channel including a frequency band over which the paging message is transmitted at one or more of the PDCCH monitoring occasions, stopping the monitoring for whether the paging message at the set of PDCCH monitoring occasions is present.

In accordance with yet another aspect of the present disclosure, a base station is provided for controlling a paging operation of a user equipment. The base station includes: a controller configuring extended PDCCH monitoring occasion indication information, and a transmitter transmitting the extended PDCCH monitoring occasion indication information to the user equipment and transmitting a reference signal or a PDCCH at a set of PDCCH monitoring occasions included in a paging occasion, which is configured using the extended PDCCH monitoring occasion indication information. Wherein, the user equipment monitors whether a paging message is present at the set of PDCCH monitoring occasions and stops the monitoring for whether the paging message is present when the reference signal or the PDCCH is detected.

In accordance with embodiments of the present disclosure, a paging operation is performed efficiently while reducing power consumption.

DETAILED DESCRIPTION

Figure 1:
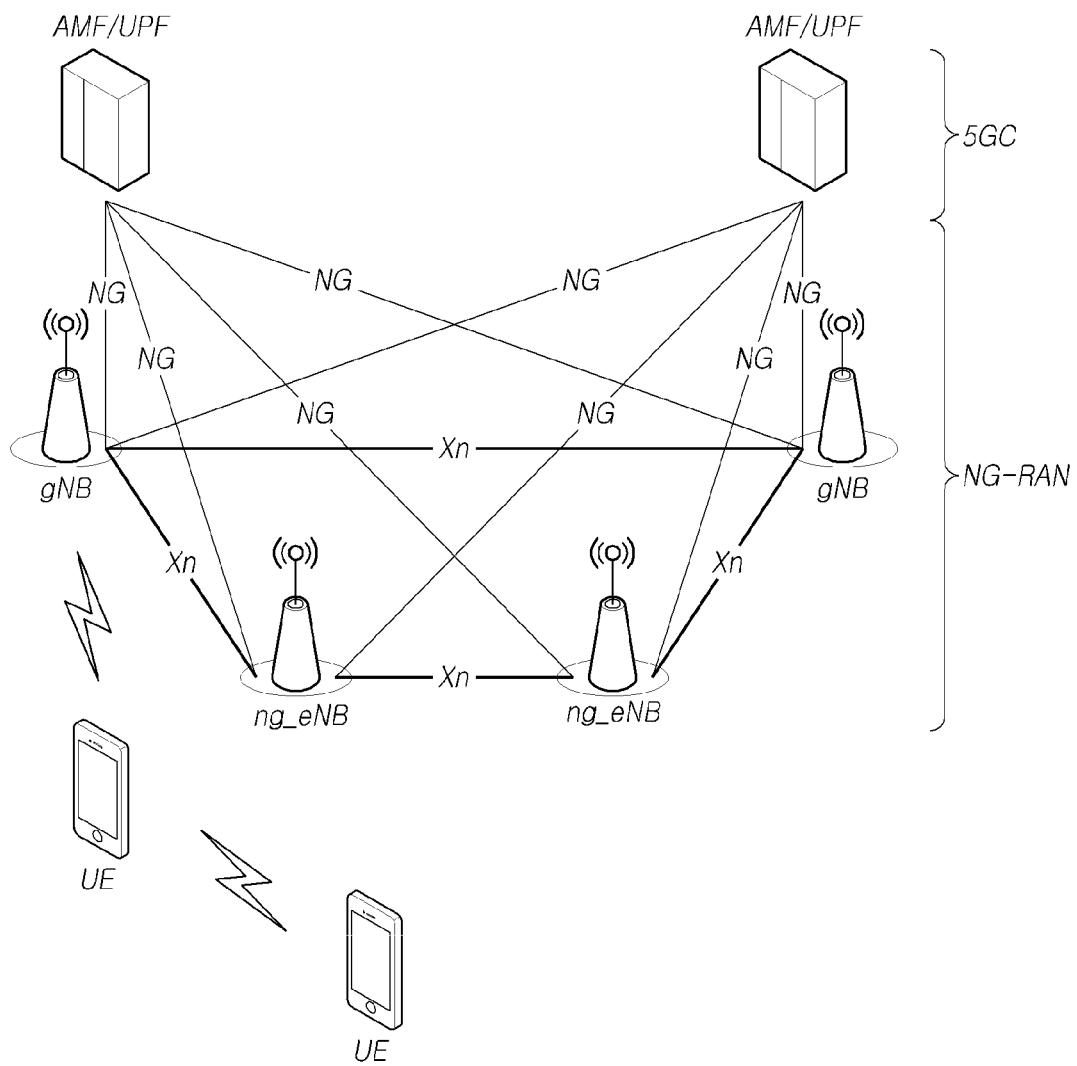
FIG. 1 is a diagram schematically illustrating a structure of a NR wireless communication system according to embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice call service, a data packet service, and the like, using radio resources. Such a wireless communication system may include a terminal, a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (Wi-MAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The terminal used in the present specification must be interpreted as a broad meaning that indicates a device including a wireless communication module that communicates with a base station in a wireless communication system. The terminal may include user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the terminal may be a portable user device, such as a smart phone, or may be a vehicle, a device including a wireless communication module in the vehicle, and the like in a V2X communication system according to the usage type thereof. In the case of a machine-type communication system, the terminal may refer to an MTC terminal, an M2M terminal, or a URLLC terminal, which employs a communication module capable of performing machine-type communication.

A base station or a cell in the present specification refers to an end that communicates with a terminal through a network. The base station or the cell encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a terminal.

The various cells listed above are provided with a base station controlling one or more cells, and the base station may be interpreted as two meanings. The base station may be 1) a device for configuring a megacell, a macrocell, a microcell, a picocell, a femtocell, or a small cell in connection with a wireless region and providing a wireless communication service within the cell, or may be 2) a wireless region itself. In the above description 1), base stations denotes the devices are controlled by the same entity for forming predetermined wireless regions and providing the communication service within the predetermined wireless regions or all devices interacting and cooperating with each other to configure a wireless region and provide a communication service within the wireless region. A point, a transmission/reception point, a transmission point, a reception point, and the like are examples of the base stations according to the configuration method of the wireless region. In the above description 2), a base station may denote the wireless region in which a user terminal is able to receive data from or to transmit data to other user terminals or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a terminal to a base station, and a downlink (DL) refers to a scheme of transmitting data from a base station to a terminal. The downlink may mean communication or communication paths from multiple transmission/reception points to a terminal, and the uplink may mean communication or communication paths from a terminal to multiple transmission/reception points. In the downlink, a transmitter may be a part of the multiple transmission/reception points, and a receiver may be a part of the terminal. In addition, in the uplink, the transmitter may be a part of the terminal, and the receiver may be a part of the multiple transmission/reception points.

The uplink and downlink transmit and receive control information through a control channel, such as a physical downlink control channel (PDCCH), a physical uplink control channel (PUCCH), and the like, and transmit and receive data by configuring a data channel such as a physical downlink shared channel (PDSCH), a physical uplink shared channel (PUSCH), or the like. Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the existing 4G LTE scenarios to support an enhanced mobile broadband (eMBB) scenario in terms of services, a massive machine-type communication (mMTC) scenario in which terminals spread over a broad region at a high terminal density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system presents various technological changes in terms of flexibility in order to provide forward compatibility. The primary technical features of NR will be described below with reference to the drawings.

<Overview of NR System>

FIG. 1 is a view schematically illustrating a structure of an NR system to which the embodiment is applicable.

Referring to FIG. 1, the NR system is divided into a 5G core network (5GC) and an NG-RAN part. The NG-RAN part includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a terminal connection and mobility control function, and a user plane function (UPF) controlling user data. NR supports both frequency bands below 6 GHz (frequency range 1) (FR1) and frequency bands equal to or greater than 6 GHz (frequency range 2) (FR2).

The gNB denotes a base station that provides a terminal with an NR user plane and control plane protocol end, and the ng-eNB denotes a base station that provides a terminal with an E-UTRA user plane and control plane protocol end. The base station described in the present specification should be understood as encompassing the gNB and the ng-eNB, and the base station may be used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "$\mu$" is used as an exponential value of 2 to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
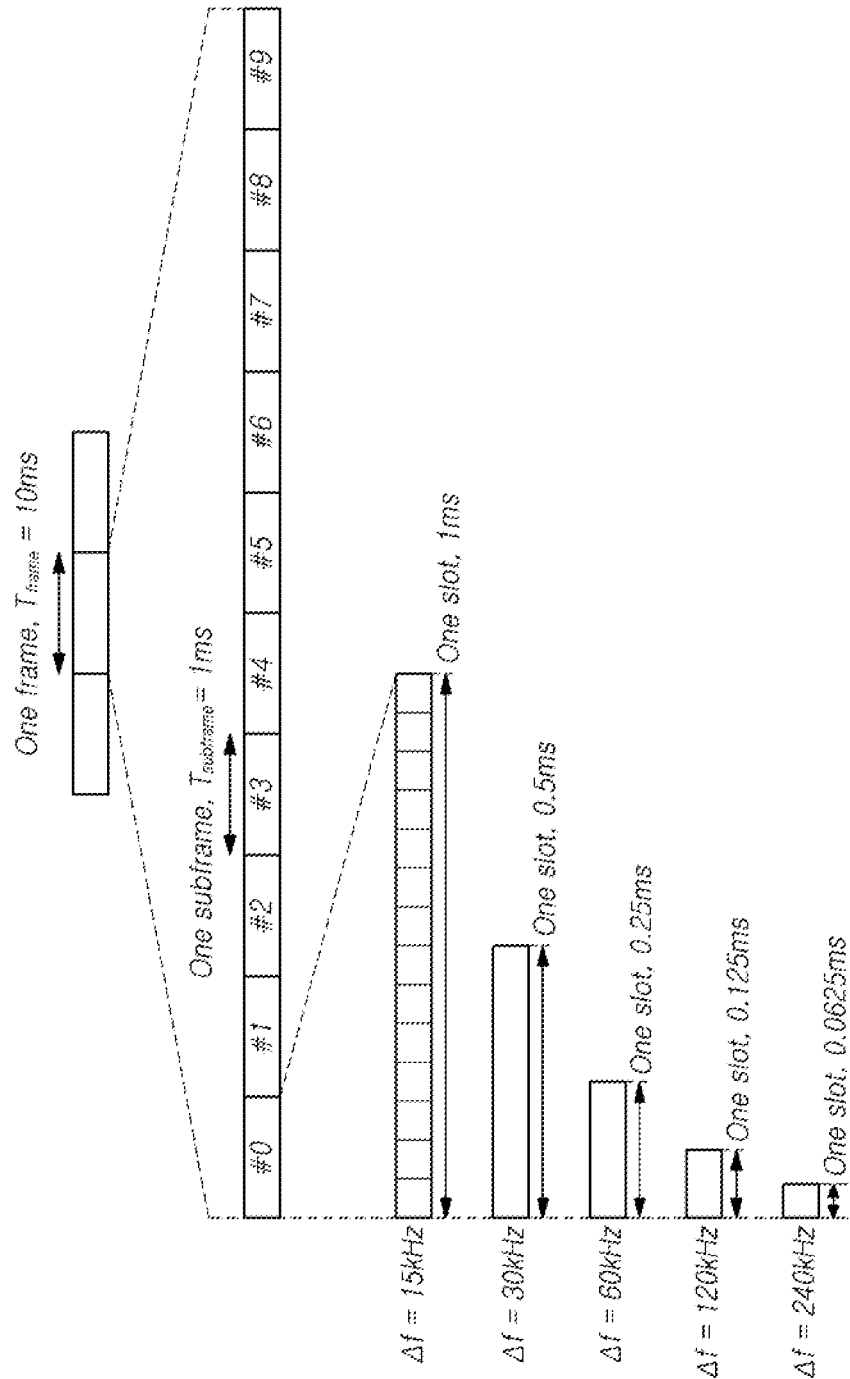
FIG. 2 is a diagram illustrating a frame structure of a NR system according to embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 12, or 240 kHz. In addition, an extended CP is applied only to the subcarrier spacing of 60 kHz. In the frame structure in NR, a frame is defined to include 10 subframes each having the same length of 1 ms and to have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view schematically illustrating a structure of an NR system to which embodiments are applicable.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined, and such a slot structure is referred to as a "self-contained structure".

NR was designed to support a total of 256 slot formats, and 62 slot formats thereof are used in 3GPP Rel-15. In addition, NR supports a common frame structure constituting an FDD or TDD frame through combinations of various slots. For example, NR supports a slot structure in which all symbols of a slot are configured for a downlink, a slot structure in which all symbols are configured for an uplink, and a slot structure in which downlink symbols and uplink symbols are mixed. In addition, NR supports data transmission that is scheduled to be distributed to one or more slots. Accordingly, the base station may inform the terminal of whether the slot is a downlink slot, an uplink slot, or a flexible slot using a slot format indicator (SFI). The base station may inform a slot format by providing, using the SFI, the index of a table configured through UE-specific RRC signaling, and the base station may dynamically inform the slot format through downlink control information (DCI) or may statically or quasi-statically provide the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from another channel carrying a different symbol on the same antenna port. If it infer large-scale properties of a first channel carrying a symbol on an antenna port from a second channel carrying a symbol on another antenna port, the two first and second antenna ports may have a quasi-co-located or quasi-co-location (QC/QCL) relationship. The large-scale properties include at least one of delay spread, Doppler spread, a frequency shift, an average received power, and a received timing.

Figure 3:
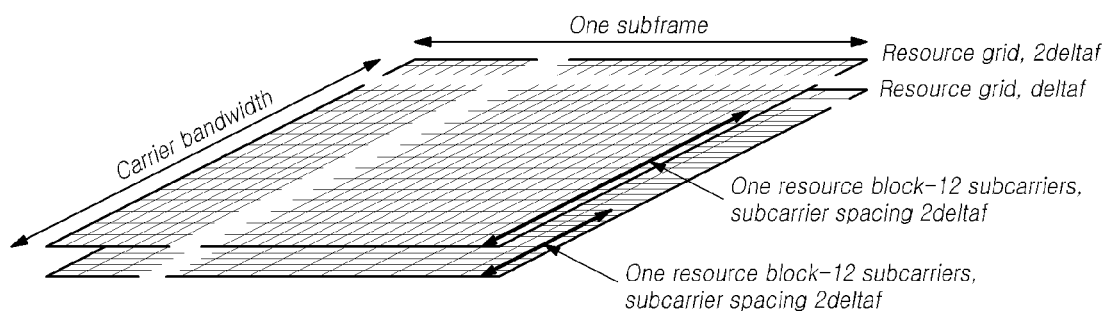
FIG. 3 is a diagram illustrating a resource grid supported by a radio access technology according to embodiments of the present disclosure.

FIG. 3 is a view for explaining resource grids supported by a radio access technology to which the embodiment is applicable.

Referring to FIG. 3, multiple resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
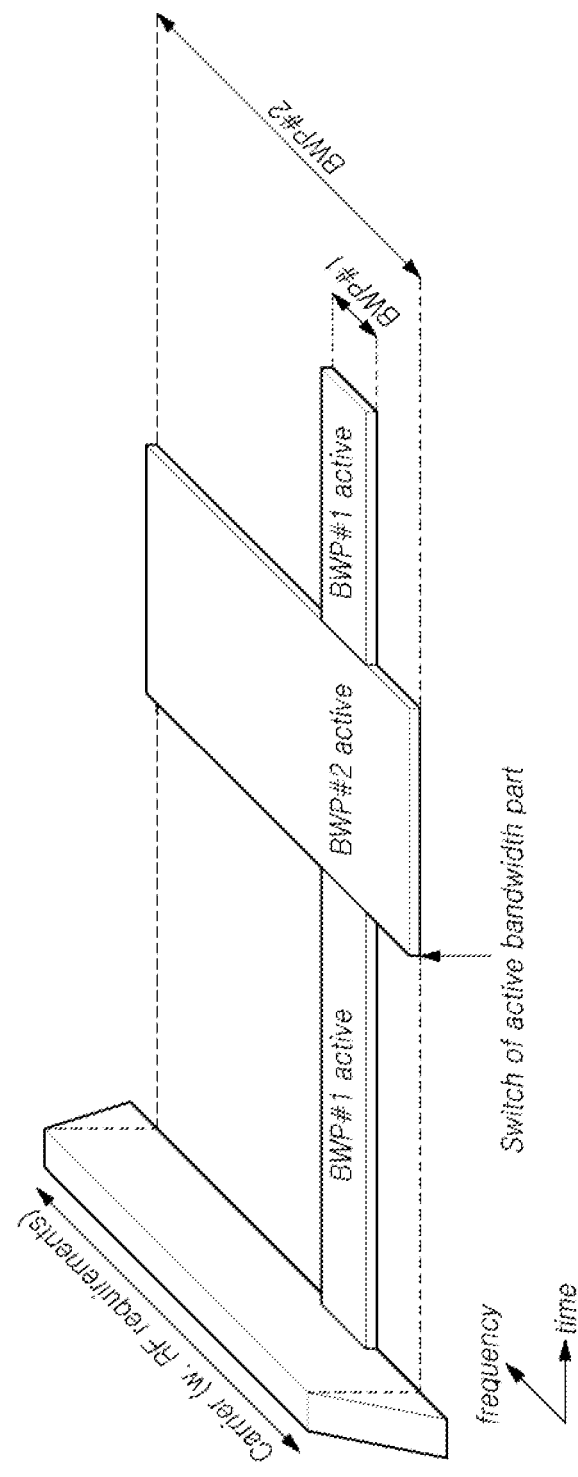
FIG. 4 is a diagram illustrating a bandwidth part supported by a radio access technology according to embodiments of the present disclosure.

FIG. 4 is a view for explaining bandwidth parts supported by a radio access technology to which the embodiment is applicable.

In LTE, the carrier bandwidth is fixed to 20 MHz. Unlike LTE, the maximum carrier bandwidth is configured as 50 MHz to 400 MHz depending on the subcarrier spacing in NR. Therefore, it is not assumed that all terminals use the entire carrier bandwidth. Accordingly, as shown in FIG. 4, bandwidth parts (BWPs) may be specified within the carrier bandwidth in NR so that the terminal may use the same. In addition, the bandwidth part may be associated with one numerology, may include a subset of consecutive common resource blocks, and may be activated dynamically over time. The terminal has up to four bandwidth parts in each of the uplink and the downlink, and transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a terminal performs a cell search and a random access procedure in order to access and communicates with a base station.

The cell search is a procedure in which the terminal synchronizes with a cell of a corresponding base station using a synchronization signal block (SSB) transmitted from the base station and acquires a physical-layer cell ID and system information.

Figure 5:
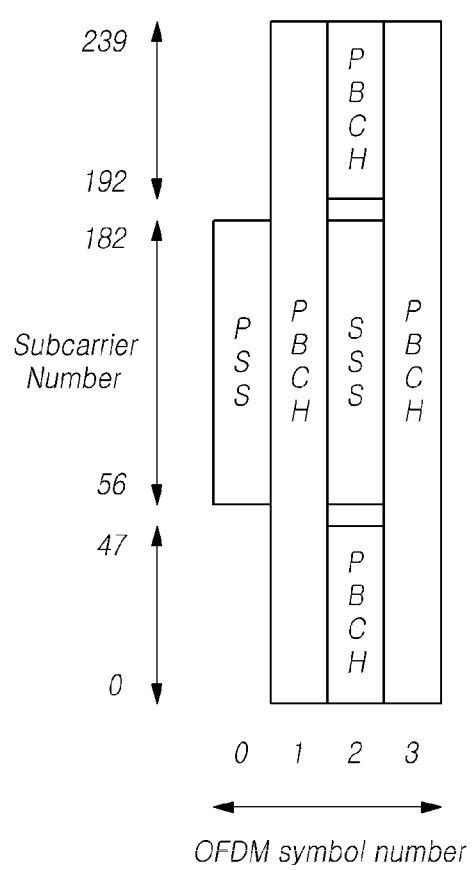
FIG. 5 is a diagram illustrating an example of a synchronization signal block in a radio access technology according to embodiments of the present disclosure.

FIG. 5 is a view illustrating an example of a synchronization signal block in a radio access technology to which embodiments are applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The terminal monitors the SSB in the time and frequency domain, thereby receiving the SSB.

The SSB may be transmitted up to 64 times for 5 ms. A plurality of SSBs are transmitted by different transmission beams within a time of 5 ms, and the terminal performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the terminal monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the terminal because the frequency spacing thereof is configured to be wider than that of the carrier raster.

The terminal may acquire a master information block (MIB) through the PBCH of the SSB. The MIB (master information block) includes minimum information for the terminal to receive remaining minimum system information (RMSI) broadcast by the network. In addition, the PBCH may include information on the position of the first DM-RS symbol in the time domain, information for the terminal to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the terminal to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the terminal to perform the initial random access procedure, and SIB1 is periodically transmitted through a PDSCH. In order to receive SIB1, the terminal must receive numerology information used for the SIB1 transmission and the CORESET (control resource set) information used for scheduling of SIB1 through a PBCH. The terminal identifies scheduling information for SIB1 using SI-RNTI in the CORESET, and acquires SIB1 on the PDSCH according to scheduling information. The remaining SIBs other than SIB1 may be periodically transmitted, or may be transmitted according to the request of the terminal.

Figure 6:
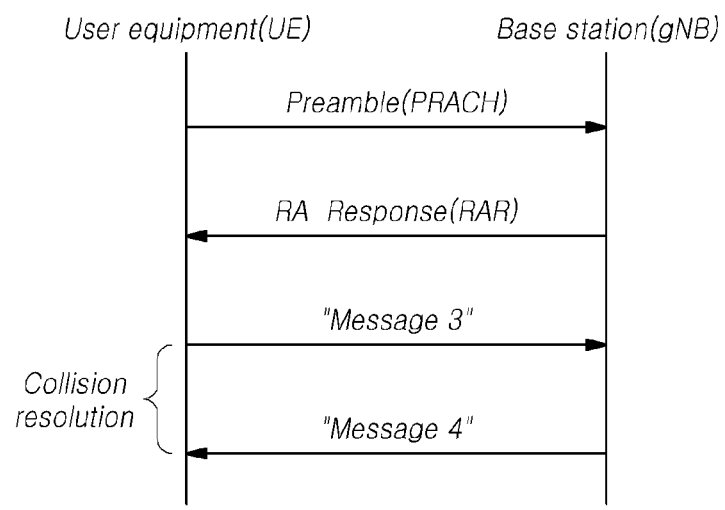
FIG. 6 is a diagram illustrating a random access procedure in a radio access technology according to embodiments of the present disclosure.
Figure 7:
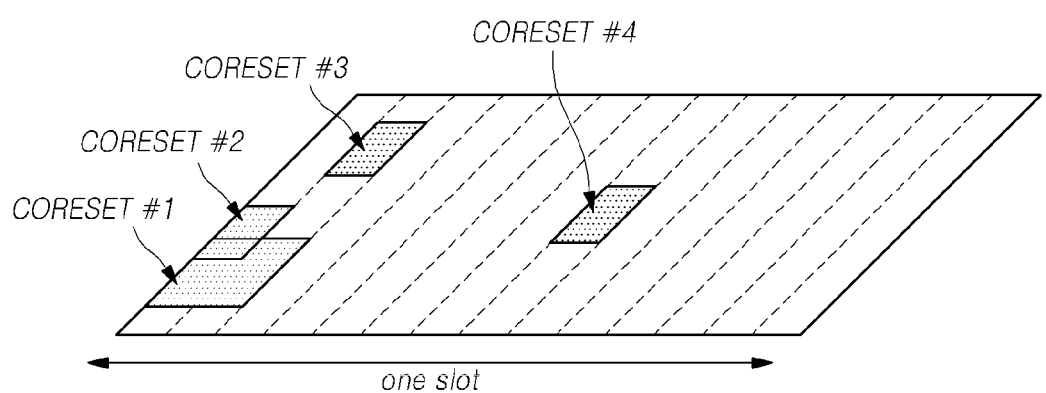
FIG. 7 is a diagram illustrating CORESETs.

FIG. 6 is a view for explaining a random access procedure of a radio access technology to which the embodiments are applicable.

Referring to FIG. 6, if a cell search is completed, the terminal transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the terminal makes initial access to a cell, and a non-contention-based random access procedure is performed when the terminal performs random access for beam failure recovery (BFR).

The terminal receives a random access response according to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more terminals, the random access preamble identifier may be included in order to inform of the terminal which the included UL Grant, temporary C-RNTI, and TAC are valid. The random access preamble identifier may be an identifier of the random access preamble received by the base station. The TAC may be included as information for the terminal to adjust uplink synchronization. The random access response may be indicated by a random access identifier on the PDCCH, i.e., a random access-radio network temporary identifier (RA-RNTI).

Upon receiving a valid random access response, the terminal processes information included in the random access response and performs scheduled transmission to the base station. For example, the terminal applies the TAC and stores the temporary C-RNTI. In addition, the terminal transmits, to the base station, data stored in the buffer of the terminal or newly generated data using the UL Grant. In this case, information for identifying the terminal must be included in the data.

Lastly, the terminal receives a downlink message to resolve the contention. 5G NR(New Radio)

Hereinafter, embodiments of the present disclosure will be described based on two nodes, i.e. a user equipment (referred to as "UE") and a base station. However, this is merely for convenience of description and ease of understanding, and an identical technical idea or principle can be applied between UEs. For example, a base station described below may denote, for example, a node performing communication with a UE, and when needed, be replaced with another UE communicating with the UE, an infrastructure apparatus, or the like.

That is, embodiments or principles of the present disclosure may be applicable to, as well as communication between a UE and a base station, device-to-device (D2D) communication, sidelink communication, vehicle communication (V2X), or the like. In particular, embodiments of the present disclosure may be applicable to communication between UEs employing the next generation radio access technology. The terms of a signal, a channel etc. described herein may be used variously depending on types of communication between UEs.

For example, as terms of PSS and the SSS, a primary D2D synchronization signal (PSSS) and a secondary D2D synchronization signal (SSSS) may be used respectively. Further, as a channel carrying broadcast information, such as the PBCH, a PSBCH may be used instead. As a channel transferring data in sidelink, such as the PUSCH and the PDSCH, a PSSCH may be used instead. As a channel transferring control information, such as the PDCCH and the PUCCH PSCCH may be used instead. Meanwhile, a discovery signal is needed in the D2D communication, and transmitted and/or received via a PSDCH. However, embodiments of the present disclosure are not limited to such terms.

Hereinafter, embodiments or technical spirit or principles described herein will be described, for example, based on communication between a UE and a base station; however, may be applicable to another UE with which a base station node is replaced, when needed.

The 3GPP introduced the NR, the next generation wireless communication technology. The NR supports an improved data transmission rate in comparison with the LTE. The NR is a radio access technology capable of satisfying various QoS requirements required per specified usage scenario. In particular, enhancement mobile broadband (eMBB), massive machine-type communication (mMTC), and ultra reliable and low latency communications (URLLC) are defined as representative usage scenarios of the NR. As a method of satisfying requirements for each scenario, the NR is designed to have a flexible frame structure in comparison with the LTE/LTE-Advanced. In the frame structure of the NR, multiple subcarrier based frame structure is supported. A basic subcarrier spacing (SCS) is 15 kHz. 15 kHz*2^n of SCSs may be defined and total 5 types of SCSs are supported.

Figure 8:
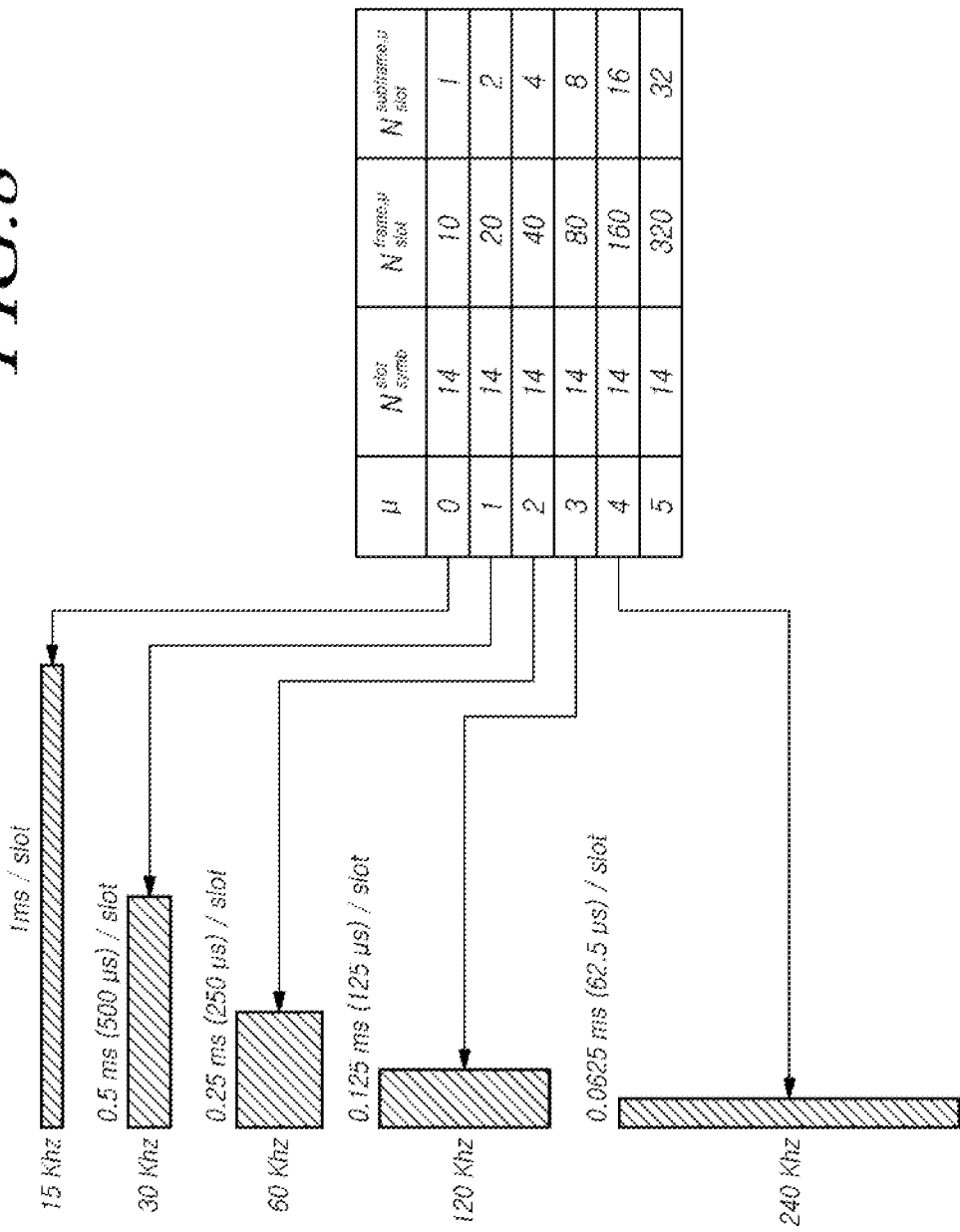
FIG. 8 is a diagram illustrating an example of arranging different subcarrier spacings at symbol level according to embodiments of the present disclosure.

FIG. 8 is a diagram illustrating an example of arranging different subcarrier spacings at symbol level according to embodiments of the present disclosure.

Referring to FIG. 8, a length in the time axis of a slot varies depending on numerologies. As illustrated, the greater the length of a slot reduces, the larger the SCS is. In addition, in the NR, the number of OFDM symbols forming the slot, a value of y, has been fixed as y=14 regardless of a SCS value in the case of a normal CP. Accordingly, a slot is made up of 14 symbols. According to a transmission direction for the slot, all symbols may be used for DL transmission or UL transmission, or symbols may be used in the configuration of a DL portion+a gap+an UL portion.

Further, a mini-slot is defined to be made up of fewer symbols than the slot in a numerology (or SCS). A time-domain scheduling interval with a short length may be configured for UL/DL data transmission/reception based on the mini-slot, or a time-domain scheduling interval with a long length may be configured for UL/DL data transmission/reception by slot aggregation. Particularly, in case latency critical data are transmitted/received, as in the URLLC, it may be difficult to satisfy a latency requirement when scheduling is performed based on a unit of a slot based on 1 ms (14 symbols) defined in a frame structure based on a numerology having a small SCS value, for example, 15 kHz. Accordingly, a mini-slot formed of fewer OFDM symbols than a slot formed of 14 symbols may be defined, and thereby, scheduling capable of satisfying requirements of the URLLC may be performed based on the defined mini-slot.

Figure 9:
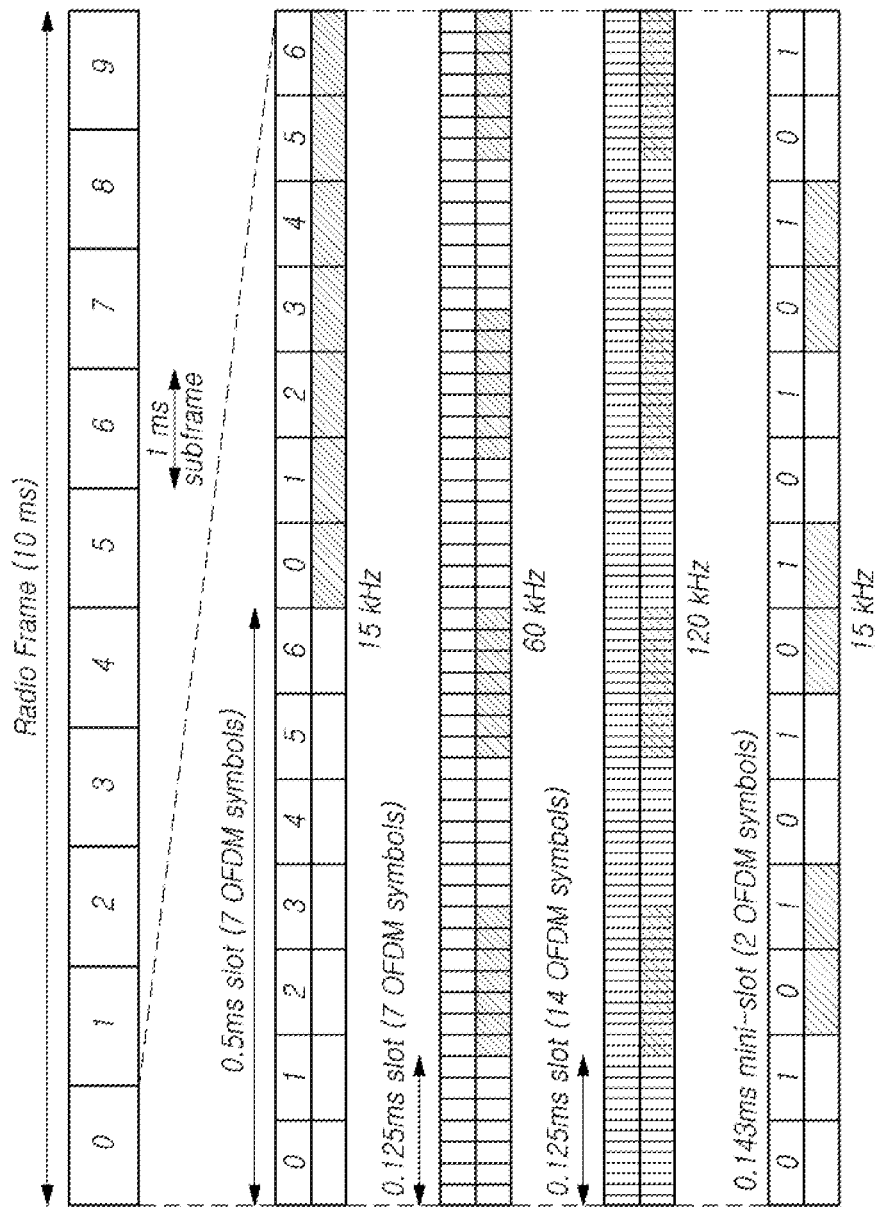
FIG. 9 is a diagram illustrating a time domain structure in a next generation wireless communication system according to embodiments of the present disclosure.

FIG. 9 is a diagram illustrating a time domain structure in a next generation wireless communication system according to embodiments of the present disclosure.

Referring to FIG. 9, the following structure is supported in the time axis in the NR. Unlike the LTE, the slot has been adopted as a basic scheduling unit in the NR. As in FIG. 9, the slot is formed of 14 OFDM symbols regardless of the subcarrier spacing. Further, a non-slot (mini-slot) structure formed of 2, 4, or 7 OFDM symbols, which a smaller scheduling unit, is supported. The non-slot structure may be utilized as a scheduling unit for the URLLC service.

Radio frame: Fixed 10 ms regardless of numerology (SCS).

Subframe: Fixed 1 ms as a reference for time duration. Unlike the LTE, this is not used as a unit of scheduling for data and a control signal.

Slot: Mainly used for the eMBB. It includes 14 OFDM symbols.

Non-slot (i.e. mini-slot): Mainly used for the URLLC, but not limited to URLLC only. It includes 2, 4, or 7 OFDM symbols.

One TTI duration: A Time duration for data/control channel transmission. A number of OFDM symbols per a slot/non-slot in the time domain.

NR Paging Procedure

A paging technology is used for receiving a message, information, a signal or the like from a network to an RRC idle, or RRC inactive UE, or used for informing an RRC idle, RRC inactive, or RRC connected UE of a change in system information and an earthquake and tsunami warning system (ETWS) or commercial mobile alert system (CMAS) indication. For example, an RRC idle UE monitors a paging channel for core network (CN)-initiated paging, and an RRC inactive UE monitors a paging channel for RAN-initiated paging.

Figure 10:
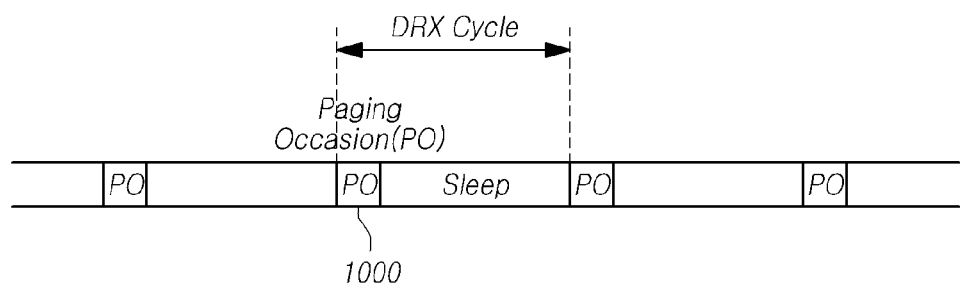
FIG. 10 is a diagram illustrating a paging occasion according to embodiments of the present disclosure.

FIG. 10 is a diagram illustrating a paging occasion according to embodiments of the present disclosure.

Referring to FIG. 10, a paging DRX is defined for reducing power consumption of an RRC idle or RRC inactive UE. A paging DRX cycle may be configured by a network as follows.

For CN-initiated paging, a default cycle is broadcast in system information.

For CN-initiated paging, a UE specific cycle may be configured via NAS signaling.

For RAN-initiated paging, a UE-specific cycle may be configured via RRC signaling.

The UE uses the shortest of the DRX cycles applicable. For example, an RRC idle UE uses the shortest of the default and UE specific cycles for the CN-initiated paging. Likewise, an RRC inactive UE uses the shortest of the default and UE specific cycles for the CN-initiated paging and the UE-specific cycle for the RAN-initiated paging.

Meanwhile, the UE monitors one paging occasion (PO) 1000 per a DRX cycle. The PO 1000 is a set of PDCCH monitoring occasions and can consist of multiple time slots (e.g. subframe or OFDM symbol) where a paging DCI is sent. One paging frame (PF) is one radio frame and may contain one or multiple PO(s) 1000 or starting point of a PO 1000. In multi-beam operations, the length of one PO 1000 is one period of beam sweeping, and the UE can assume that the same paging message is repeated in all beams of the sweeping pattern. Thus, the selection of the beam(s) for the reception of the paging message is up to UE implementation.

The UE monitors whether a paging message is transferred in the PO 1000, which is determined based on whether a PDCCH scrambled with a P-RNTI is received at a set of PDCCH monitoring occasions of the PO.

The PF and the PO are determined by the following formula.

A system frame number (SFN) for the PF is determined by the following formula.

$$(SFN+PF\_offset) \bmod T = (T \text{ div } N)*(UE\_ID \bmod N)$$

Further, an index (i_s) indicating a starting point of a set of PDCCH monitoring occasions for paging DCI is determined by the following formula.

$$i\_s = \text{floor}(UE\_ID/N) \bmod Ns$$

The PDCCH monitoring occasions for paging are determined according to 'paging-SearchSpace' and 'firstPDCCH-MonitoringOccasionOfPO' if configured. Otherwise, the PDCCH monitoring occasions for paging are determined according to the default association. For example, PDCCH monitoring occasions for paging are same as for RMSI.

For default association, Ns is either 1 or 2. For Ns=1, there is only one PO which starts in the PF. For Ns=2, PO is either in the first half frame (i_s=0) or the second half frame (i_s=1) of the PF.

For non-default association (i.e. when paging-SearchSpace is used), the UE monitors the (i_s+1)th PO where the first PO starts in the PF. The PDCCH monitoring occasions for paging which are not overlapping with UL symbols are sequentially numbered from zero starting from the 1st PDCCH monitoring occasion for paging in the PF.

When 'firstPDCCH-MonitoringOccasionOfPO' is present, the (i_s+1)th PO is a set of 'S' consecutive PDCCH monitoring occasions for paging starting from the PDCCH monitoring occasion indicated by 'firstPDCCH-MonitoringOccasionOfPO'. For example, the (i_s+1)th value of the 'firstPDCCH-MonitoringOccasionOfPO' parameter.

Otherwise, the (i_s+1)th PO is a set of 'S' consecutive PDCCH monitoring occasions for paging starting from the (i_s*S)th PDCCH monitoring occasion for paging where 'S' is the number of actual transmitted SSBs determined according to 'ssb-PositionsInBurst' in SystemInformationBlock1. The Kth PDCCH monitoring occasion for paging in the PO corresponds to the Kth transmitted SSB.

In addition, the following parameters are used for the calculation of PF and i_s above.

T: DRX cycle of the UE. For example, the T is determined by the shortest of the UE specific DRX value, if configured by RRC or upper layers, and a default DRX value broadcast in system information. If UE specific DRX is not configured by RRC or by upper layers, the default value is applied.

N: number of total paging frames in T
Ns: number of paging occasions for a PF
PF_offset: offset used for PF determination
UE_ID: a value of 5G-S-TMSI mod 1024

The parameters of the N, Ns, and PF_offset, first-PDCCH-MonitoringOccasionOfPO, and the length of default DRX Cycle are signaled in SIB1.

If the UE has no 5G-S-TMSI, for instance when the UE has not yet registered onto the network, the UE shall use as default identity UE_ID=0 in the PF and i_s formulas above.

The 5G-S-TMSI is a 48 bit long bit string. The 5G-S-TMSI shall, in the formulas above, be interpreted as a binary number where the left most bit represents the most significant bit.

NR-Unlicensed Spectrum (NR-U)

Unlike a licensed band, any operator or individual can use an unlicensed band to provide wireless communication services within the regulations of each country, rather than a wireless channel exclusively available to any operator. Therefore, in order to provide an NR service through an unlicensed band, it is necessary to solve a co-existence problem with various short-range wireless communication protocols, such as WiFi, Bluetooth, and NFC, already having provided through the unlicensed band. Further, it is also necessary to solve a co-existence problem between an NR operator or an LTE operator.

Accordingly, when the NR service is provided through an unlicensed band, it requires a coexisting technology for avoiding interference or collision between wireless communications services. For example, it is necessary to support a listen before talk (LBT)-based radio channel access scheme in which a power level of a radio channel or a carrier to be used is sensed before transmitting a radio signal and then it is determined whether the corresponding radio channel or carrier is available to use. In this case, when a specific radio channel or carrier of the corresponding unlicensed band is being used by another wireless communication protocol or another operator, there is a possibility that any restriction may be imposed in providing the NR service through the corresponding band. Accordingly, unlike the wireless communication service through the licensed band, it is not easy to guarantee QoS required by users in the wireless communication service through the unlicensed band. In particular, in the case of the NR-U, unlike the LTE that has mandatorily supported an unlicensed band through carrier aggregation with a licensed band, a stand-alone NR-U cell may be supported as a deployment scenario of the NR for an unlicensed band. In this case, it is necessary for the stand-alone NR-U cell or an NR or LTE cell in a licensed band to satisfy a certain level of QoS.

However, in case of using the NR-U independently, there is a large chance that a UE will have a delay in receiving a paging message if a base station performs the LBT (listen before talk) for transmitting the paging message. Further, for compensating a transmission opportunity decrease resulted from an LBT failure, a network may increase a transmission opportunity per paging DRX or configure the paging DRX to have a short period. In this case, a paging load may significantly increase in the network. Further, if a UE is allowed to have more DRX timings or more transmission opportunities per a DRX, it may increase power consumption of the UE for monitoring paging transmission.

As described above, when a base station uses a unlicensed band to perform a paging operation, the UE may consume more power unnecessarily because of the paging failure or the increased paging opportunities. These problems relate to the most basic paging operation and pose a substantial restriction to the use of the unlicensed band. Accordingly, in accordance with embodiments of the present disclosure, an effective paging method and apparatus are provided taking into account the LBT failure and the power consumption of a UE in an unlicensed band.

Hereinafter, embodiments will be described based on the NR. However, the embodiments are not limited thereto. This is merely for convenience of description; therefore, embodiments of the present disclosure may be applied to the LTE or other radio access networks, and thus, such applications are included in the scope of the present disclosure. Further, embodiments of the present disclosure may be applicable to the normal NR access technology using a licensed band as well. That is, embodiments of the present disclosure for reducing the power consumption of a UE may be equally or substantially equally applicable to a licensed band. Embodiments of the present disclosure may be used in one or more of the following unlicensed band implementation environments.

NR-U LAA: NR-U in "license assisted access" mode where primary cell is NR licensed NR-U SA: NR-U stand-alone mode ENU-DC: EN-DC where SN (secondary node) is NR-U NNU-DC: DC between NR licensed (MN: master node) and NR-U (SN)

As described above, in the NR-U, a transmit opportunity may be reduced due to support for the LBT, and it may not be easy to give a guarantee of radio channel access. Therefore, it may not be easy to perform data transmission/reception for satisfying a required QoS level.

In the case of the typical LTE LAA, unlike the typical LTE frame, LTE operation in the unlicensed band has been supported by defining frame type 3. The frame type 3 is a new frame structure configured with a non-empty subframe and an empty subframe. In the non-empty subframe, data transmission is performed. In the empty subframe, data transmission is not performed. For configuring the non-empty subframe, it is determined whether a channel is available for access/occupation through clear channel assessment (CCA) in the empty subframe (an interval at which data transmission is not performed), and the channel is occupied and used according to the result of the CCA. A data transmission time configured with the non-empty subframe cannot exceed a maximum allowed time. An additional data burst may be transmitted only in the maximum allowed channel time. LTE transmission is performed based on the unit of the subframe (1 ms), the CCA is performed based on a unit of a time (several μs) smaller than the subframe (1 ms). Accordingly, the channel may be occupied at any point within the subframe, not a starting point of the subframe, and a last point may also become a point within the subframe due to the maximum allowed channel occupation time limitation.

Hereinafter, an operation of a UE for performing embodiments of the present disclosure will be described.

Figure 11:
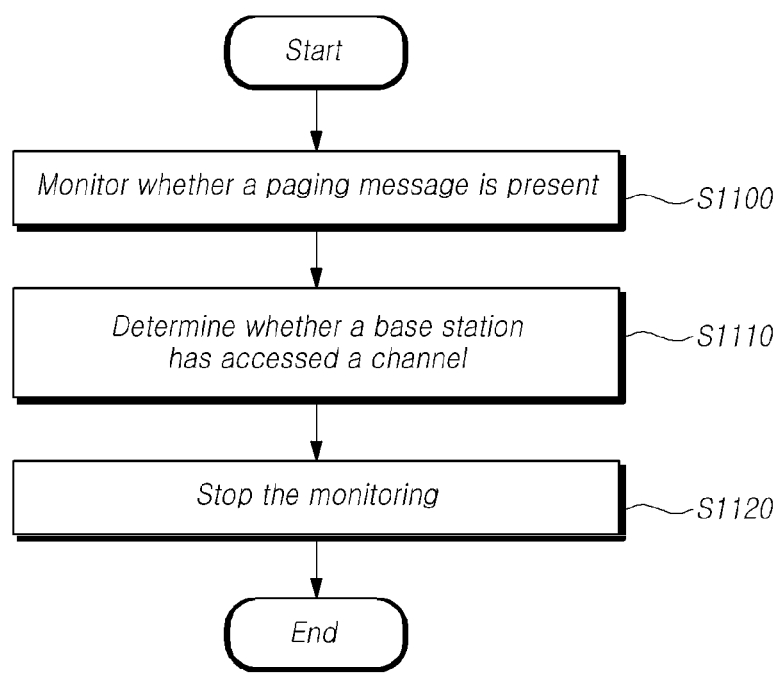
FIG. 11 is a flow diagram illustrating an operation of a user equipment according to embodiments of the present disclosure.

FIG. 11 is a flow diagram illustrating the operation of the UE according to embodiments of the present disclosure.

Referring to FIG. 11, a UE performing a paging operation may monitor whether a paging message is present at a set of PDCCH monitoring occasions included in a paging occasion, at step S1100.

For example, the UE monitors, in a DRX cycle, whether the paging message is received. That is, the UE monitors whether a paging message for the UE is present at a set of PDCCH monitoring occasions of a paging occasion (PO) configured in the DRX cycle. For example, the UE performs blind decoding to monitor whether a signal scrambled with a paging radio network temporary identifier (P-RNTI) is present in the PDCCH monitoring occasions.

Meanwhile, the set of PDCCH monitoring occasions is configured by 'M' repetitions of 'S' consecutive PDCCH monitoring occasions. Here, the S denotes the number of transmitted SSBs determined based on a system information block, and the M may be set to a natural number of 1 or more. That is, the set of PDCCH monitoring occasions is configured with one or more PDCCH monitoring occasions. Further, the set of PDCCH monitoring occasions may be configured by M repetitions of S PDCCH monitoring occasions.

If the paging occasion is not configured with extended PDCCH monitoring occasions, the set of the paging monitoring occasions is configured with S consecutive PDCCH monitoring occasions. Unlike this, if the extended PDCCH monitoring occasions are configured, the set of the paging monitoring occasions is configured with M repetitions of S consecutive PDCCH monitoring occasions, that is, configured with S*M PDCCH monitoring occasions.

Herein, embodiments of the present disclosure are described based on a paging occasion configured with extended PDCCH monitoring occasions, but not limited thereto. That is, a set of PDCCH monitoring occasions configured with two or more PDCCH monitoring occasions may be also applicable to embodiments of the present disclosure.

Meanwhile, the M value may be received from a base station by being included in extended PDCCH monitoring occasion indication information. The extended PDCCH monitoring occasion indication information may include the M value and be received through high layer signaling. Alternatively, the extended PDCCH monitoring occasion indication information may be broadcast through system information.

If the M value is set to 1, or the extended PDCCH monitoring occasion indication information is not received, the UE configures and monitors a set of PDCCH monitoring occasions with S consecutive PDCCH monitoring occasions.

The UE determines or detects whether the base station has accessed to a channel including a frequency band over which a paging message is transmitted at the set of PDCCH monitoring occasions, at step S1110.

The UE may determine whether the base station has accessed the corresponding channel at the set of PDCCH monitoring occasions. For example, the frequency band of the corresponding channel may be a licensed band or an unlicensed band. As an example, in the case of the unlicensed band, the UE determines or detects whether the base station has accessed the channel including the corresponding frequency band through successful occupation after having performed the LBT or the like. As another example, in the case of the licensed band, the UE determines or detects whether the base station has accessed the channel by determining or detecting whether the base station transmits a signal in the corresponding frequency band.

This is for preventing power consumption of the UE resulted from undesirably monitoring a paging message by determining or detecting whether the base station has transmitted a signal in a frequency band over which a paging message is transmitted at the set of PDCCH monitoring occasions.

For example, when the UE detects a PDCCH scrambled with a radio network temporary identifier (RNTI) except for a reference signal or a P-RNTI (paging-RNTI) transmitted from the base station, the UE may determine that the base station has accessed the channel. As an example, when the UE receives a demodulation reference signal (DMRS) transmitted from the base station at the set of PDCCH monitoring occasions, the UE determines that the base station has accessed a channel of a frequency band over which the paging message is transmitted. As another example, when the UE detects a PDCCH transmitted from the base station at the set of PDCCH monitoring occasions, the UE determines that the base station has accessed a channel of a frequency band over which the paging message is transmitted. Here, the PDCCH may include a signal scrambled with another RNTI except for the P-RNTI. As further another example, when the UE receives a signal scrambled with the P-RNTI at the set of PDCCH monitoring occasions, the UE determines that the base station has accessed a channel.

When it is determined that the base station has accessed to the channel, the UE stops the monitoring for whether the paging message is present at the set of PDCCH monitoring occasions, at step S1120.

For example, when it is determined that the base station has accessed a channel including a frequency band of the set of PDCCH monitoring occasions, the UE stops paging message monitoring in a subsequent PDCCH monitoring occasion. Specifically, it is assumed that a set of PDCCH monitoring occasions is configured with a total of 4 PDCCH monitoring occasions, from index 0 to index 3. In this case, the UE monitors whether a paging message scrambled with the P-RNTI at PDCCH monitoring occasions from PDCCH monitoring occasion #0 to PDCCH monitoring occasion #3 is received.

If it is determined that the base station has accessed a channel at PDCCH monitoring occasion #1, the UE stops monitoring for detecting a paging message at PDCCH monitoring occasion #2 and PDCCH monitoring occasion #3.

Such paging message monitoring stopping may be applied only to a discontinuous reception (DRX) cycle including a paging occasion in which it is determined that the base station has accessed a channel. For example, when a PO is present in a paging DRX cycle, and it is detected that a base station has accessed a channel at a set of PDCCH monitoring occasions, the UE stops the paging message monitoring only at the remaining PDCCH monitoring occasion(s) configured in the PO of the paging DRX cycle. The UE performs the paging message monitoring again in a PO in a subsequent paging DRX cycle. That is, the paging message monitoring stopping in accordance with embodiments of the present disclosure is applied to only a corresponding DRX cycle, and does not affect into a subsequent DRX cycle.

When the base station has successfully accessed a corresponding frequency band, but does not transmit a paging message, it may be regarded that a paging message does not present in a corresponding DRX cycle. Accordingly, the UE may prevent power consumption by stopping undesired blind decoding at the set of PDCCH monitoring occasions in the corresponding PO.

Hereinafter, examples of operations in accordance with embodiments of the present disclosure will be discussed with reference to the accompanying drawings.

Figure 12:
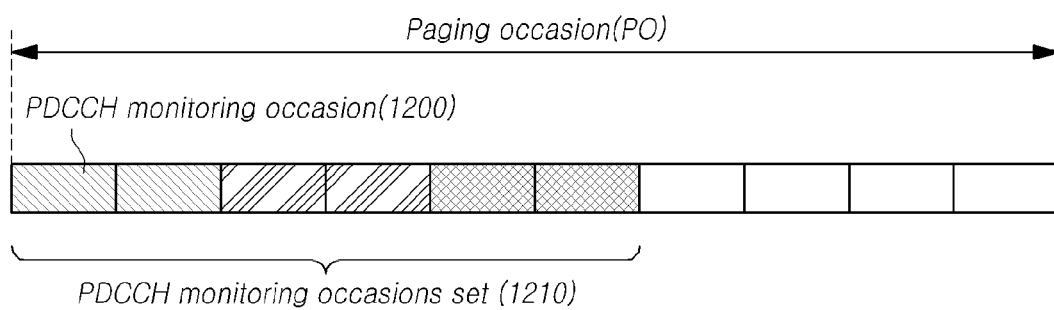
FIG. 12 is a diagram illustrating a set of PDCCH monitoring occasions according to embodiments of the present disclosure.

FIG. 12 is a diagram illustrating a set of PDCCH monitoring occasions according to embodiments of the present disclosure.

Referring to FIG. 12, a paging occasion (PO) in a paging DRX cycle may include one or more PDCCH monitoring occasions 1210. As described above, the set of PDCCH monitoring occasions 1210 may include one or more PDCCH monitoring occasions 1200. For example, the set of PDCCH monitoring occasions 1210 may be configured with M repetitions of S consecutive PDCCH monitoring occasions.

As an example, as illustrated in FIG. 12, 2 PDCCH monitoring occasions 1200 repeat 3 times; thereby a set of PDCCH monitoring occasions 1210 may be configured with a total of 6 PDCCH monitoring occasions 1200.

Figure 13:
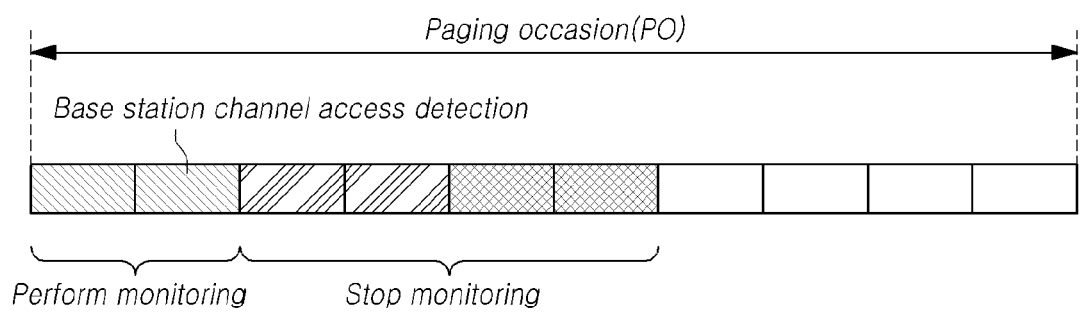
FIG. 13 is a diagram illustrating paging message monitoring stopping according to embodiments of the present disclosure.

FIG. 13 is a diagram illustrating paging message monitoring stopping according to embodiments of the present disclosure.

Referring to FIG. 13, as show in FIG. 12, when a set of PDCCH monitoring occasions is configured, the UE monitors whether a paging message is received in each PDCCH monitoring occasion.

If it is detected that a base station has accessed a channel at PDCCH monitoring occasion #2, the UE stops paging message monitoring at 4 subsequent PDCCH monitoring occasions. Accordingly, the UE reduces power consumption needed for monitoring a total of 6 PDCCH monitoring occasions. That is, the UE saves power needed for blind decoding at 4 remaining PDCCH monitoring occasions by monitoring only 2 PDCCH monitoring occasions in the corresponding paging DRX cycle.

Figure 14:
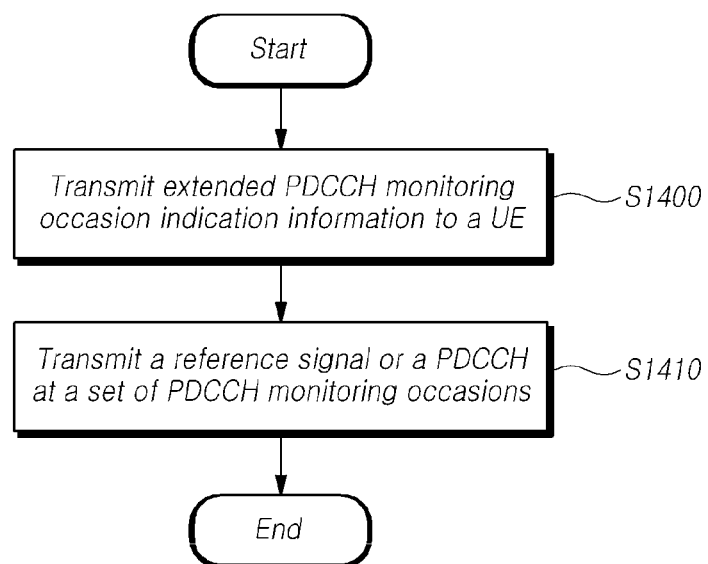
FIG. 14 is a flow diagram illustrating an operation of a base station according to embodiments of the present disclosure.

FIG. 14 is a flow diagram illustrating an operation of a base station according to embodiments of the present disclosure.

Referring to FIG. 14, a base station controlling a paging operation of a UE may transmit extended PDCCH monitoring occasion indication information to the UE, at step S1400.

The base station generates indication information for indicating extended PDCCH monitoring occasions to the UE, and then transmits it to the UE. For example, the set of PDCCH monitoring occasions may be configured with M repetitions of S consecutive PDCCH monitoring occasions. Here, the S indicates the number of transmitted SSBs determined based on a system information block. The M value may be transmitted by being included in extended PDCCH monitoring occasion indication information. The PDCCH monitoring occasion indication information may be transmitted through high layer signaling or system information.

When the set of extended PDCCH monitoring occasions is not configured for the UE, the extended PDCCH monitoring occasion indication may be set to 1 or may not be transmitted.

The base station may transmit a reference signal or a PDCCH at the set of PDCCH monitoring occasions included in a paging occasion (PO) and configured using the extended PDCCH monitoring occasion indication information, at step S1410. For example, a frequency band over which the reference signal or the PDCCH is transmitted may be a licensed band or an unlicensed band.

As an example, when data transmission is triggered for the corresponding UE, the base station transmits a paging message for the UE in a PO in a paging DRX cycle of the UE. For example, the base station may transmit, over PDCCH, a signal scrambled with the P-RNTI at the set of PDCCH monitoring occasions. In this case, the UE receives a paging message through paging message monitoring.

As another example, the base station transmits a reference signal, such as the DMRS, at the set of PDCCH monitoring occasions of the UE. The UE monitors whether a paging message is present at the set of PDCCH monitoring occasions and stops the monitoring for whether the paging message is present when the reference signal is detected.

As further another example, the base station transmits a PDCCH scrambled with a radio network temporary identifier (RNTI) except for the P-RNTI (paging-RNTI) at the set of PDCCH monitoring occasions of the UE. The UE monitors whether a paging message is present at the set of PDCCH monitoring occasions and stops the monitoring for whether the paging message is present when the PDCCH scrambled with the RNTI except for the P-RNTI is detected.

Accordingly, the UE is able to prevent power consumption by stopping undesired blind decoding at the set of PDCCH monitoring occasions in the corresponding PO.

Hereinafter, various embodiments are discussed of effective paging methods in a NR-U in consideration of an LBT failure and an increase in power consumption of a UE. Embodiments described below may be performed in each operation or step of the UE and the base station discussed above, each of which may be applied taken alone or in combination with one or more embodiments or examples.

Further, although discussions have been conducted on cases where the set of PDCCH monitoring occasions is configured in one or more time intervals of a PO in embodiments or examples described above, the PO may be configured with only the set of PDCCH monitoring occasions. That is, the duration of the PO may be equal to the length of the set of PDCCH monitoring occasions. Hereinafter, for convenience of description, discussions are conducted based on situations where the duration of the OP and the length of the set of PDCCH monitoring occasions are equal. Accordingly, the PO and the set of PDCCH monitoring occasions may be interchangeability described as an equal meaning on the time axis.

A Method of Instructing not Performing PDCCH Monitoring for Paging at a Set of PDCCH Monitoring Occasions of a Paging Occasion.

As described above, there may be a possibility of an LBT failure when a base station performs the LBT for performing the paging procedure. Such a LTE failure decreases transmission opportunities. As a method of compensating such decreases, it is considered to increase the transmission opportunities for paging.

For example, it is possible to increase the number of paging occasions (PO) monitored by a UE per a DRX cycle. The PO includes a set of PDCCH monitoring occasions and may be formed of multiple time slots (e.g. subframe or OFDM symbol) where a paging DCI is sent. Accordingly, when the number of paging occasions (PO) for monitoring per a DRX cycle is more than one, the set of PDCCH monitoring occasions formed of multiple time slots for transmitting a paging DCI may be configured as a plurality of sets. Thus, instruction information for increasing the number of POs may be transmitted through RRC signaling (e.g. SIB1). As described above, for non-default association (ex, when paging-SearchSpace is used), a PO of a UE is configured with a set of 'S' consecutive PDCCH monitoring occasions. Here, the 'S' is the number of actual transmitted SSBs determined according to 'ssb-PositionsInBurst' in SystemInformationBlock1. In order to increase the number of PDCCH monitoring occasions for the monitoring of the UE per a DRX cycle, the S consecutive PDCCH monitoring occasions may be repeated M times. The M value may be transmitted through RRC signaling (e.g. SIB1).

As another example, it is possible to increase a length/duration of a paging occasion (PO) for monitoring per a DRX cycle. The PO includes a set of PDCCH monitoring occasions and is formed of multiple time slots for transmitting a paging DCI. In multi-beam operations, a length of one PO may be set to one period of beam sweeping. That is, one period of beam sweeping may be corresponded to S PDCCH monitoring occasions and configure a length of a set of PDCCH monitoring occasions included in the PO.

In order to increase the length/duration of the paging occasion (PO) for monitoring per a DRX cycle, in multi-beam operations, a length of one PO (a set of PDCCH monitoring occasions) may be configured in multiples (such as, 2 times, 3 times, 4 times, etc.) of the beam sweep period. Thus, in order to increase the number of PDCCH monitoring occasions for the monitoring of the UE per a DRX cycle, the S consecutive PDCCH monitoring occasions may be repeated M times. The M value may be a value equal to multiples of the beam sweep period and transmitted through RRC signaling (e.g. SIB1). As another example, the paging occasion (PO) may be configured by repetition of consecutive slots/subframes/mini-slots. As further another example, the base station may transmit indication information for indicating a value of the length/duration of the paging occasion. Information for increasing the length of the PO may be transmitted through RRC signaling (e.g. SIB1). Multiple paging occasions or repeated paging occasions described above may be configured not to overlap with a PO of another UE. To do this, it is possible to configure an extended PO by applying an offset value to a pre-configured PO.

The base station performs paging when succeeding in the LBT by performing the LBT in a pre-configured PO (or a starting point of the PO). For example, the base station transmits a PDCCH (or DCI, a short message transmitted through the DCI, for convenience of description, herein, referred to as "PDCCH") scrambled with the P-RNTI for paging, and/or a paging message indicated by this. When the PDCCH scrambled with the P-RNTI and/or the paging message indicated by the PDCCH are transmitted, the base station may instruct the paging operation in an extended paging occasion configured for the US not to be performed.

If the base station fails to perform the LBT, the base station performs the paging operation by additionally performing the LBT in an increased PO. Accordingly, the base station may continually perform the LBT operation in the increased PO until succeeding in the LBT. When the PDCCH scrambled with the P-RNTI and/or the paging message indicated by the PDCCH are transmitted, the base station does not perform the paging operation at the remaining paging monitoring occasion(s) after the PDCCH or the paging message have been transmitted. That is, the base station does not transmit a PDCCH or a paging message at the remaining PDCCH monitoring occasion(s).

Likewise, when the UE succeeds in paging reception in the pre-configured PO (or a starting point of the PO), the UE does not perform paging monitoring at the remaining PDCCH monitoring occasion(s) of the increased/added monitoring occasions. When the UE fails in paging reception in the pre-configured PO (or the starting point of the PO), the UE may perform the paging monitoring at the increased/added monitoring occasions until succeeding in the paging reception. That is, the UE is required to perform the paging monitoring until receiving the PDCCH scrambled with the P-RNTI or the paging message indicated by this at the increased/added transmission opportunity. If the UE succeeds in receiving the paging message, the UE does not perform the paging monitoring at the remaining PDCCH monitoring occasion(s) of the increased/added monitoring occasions. Through these operations, it may be possible to increase the possibility of receiving a paging message; however, performing the paging monitoring in the increased PO results in power consumption of the UE being increased.

In particular, in the case of the unlicensed band, if paging transmission is not attempted because there is no paging message to be transmitted by the base station for corresponding UEs, the UE is unable to identify whether this is resulted from no paging transmission from the base station or an LBT failure of the base station. Accordingly, even when there is no paging to be transmitted to the UE in a paging occasion, the UE may misinterpret this situation as the failure of paging transmission due to the LBT failure. Alternatively, the UE is required to perform paging monitoring in all increased paging occasions.

Accordingly, the following embodiments for preventing power consumption may be applied in addition to the embodiments or examples where the UE stops paging monitoring when the UE succeeds in the paging monitoring.

For example, even when there is no paging message to be transmitted in a paging occasion of the UE, the base station may transmit, to the UE, information for instructing the corresponding UE not to perform monitoring in an increased PO (PDCCH monitoring occasions) that is added for paging monitoring.

As another example, for a paging occasion, when there is no paging message to be transmitted to all UEs associated with the paging occasion, the base station may transmit, to the UEs, information for instructing the corresponding UEs not to perform monitoring in an increased PO (PDCCH monitoring occasions) that is added for paging monitoring.

As further another example, when the UE receives, from the base station, information for instructing the UE not to perform monitoring in an increased PO (PDCCH monitoring occasions) that is added to a paging occasion (or a first paging occasion or a pre-configured paging occasion before the increasing) of the UE, the UE may not perform monitoring in the increased PO (PDCCH monitoring occasions) configured in a paging DRX.

As further another example, when the UE receives, from the base station, information for instructing the UE not to perform monitoring for an increased PO (PDCCH monitoring occasions) added to an increased PO (PDCCH monitoring occasions) of the UE, the UE may not perform monitoring in the increased PO (PDCCH monitoring occasions) configured in the paging DRX.

As further another example, when the UE has not received, from the base station, information for instructing the UE not to perform monitoring in an increased PO (PDCCH monitoring occasions) added to a paging occasion (or a first paging occasion or a pre-configured paging occasion before the increasing) of the UE, the UE may perform monitoring in the increased PO (PDCCH monitoring occasions).

As further another example, when the UE has not received, from the base station, information for instructing the UE not to perform monitoring for an increased PO (PDCCH monitoring occasions) added to an increased PO (PDCCH monitoring occasions) of the UE, the UE may perform monitoring in the increased PO (PDCCH monitoring occasions) configured in the paging DRX.

The information for instructing the paging message monitoring operation in the PO (PDCCH monitoring occasions) of the UE as described above may be indicated in a cell-specific manner through system information (e.g., SIB1). As another example, the information for instructing the paging message monitoring operation in the PO (PDCCH monitoring occasions) of the UE may be indicated in a UE-specific manner through UE-dedicated RRC signaling (e.g., an RRC release message).

For example, the information for instructing the paging message monitoring operation in the PO (PDCCH monitoring occasions) of the UE may include at least one of information for indicating whether to support a switching operation between an increased paging occasion and a single paging occasion, information for indicating the increased paging occasion, information for indicating switching between the increased paging occasion and the single paging occasion, and condition information for triggering a corresponding function. As another example, the information for instructing the paging message monitoring operation in the PO (PDCCH monitoring occasions) of the UE may be implicitly transferred through a PDCCH or a reference signal transmitted by the base station.

Hereinafter, various embodiments for the information for instructing the paging message monitoring operation in the PO (PDCCH monitoring occasions) of the UE will be discussed.

Embodiment 1: A Method of Transferring Information for Indicating a Monitoring Operation Through a Short Message Table 2 represents examples of use of fields of short messages that can be transmitted on a PDCCH.

TABLE 2

| Bit | Short message |
| --- | --- |
| 1 | systemInfoModification |
| 2 | etwsAndCmasIndication |
| 3-8 | not used |

The systemInfoModification set to 1 indicates a BCCH modification other than SIB6, SIB7, SIB8, and SIB 9. The etwsAndCmasIndication set to 1 indicates an ETWS primary notification and/or an ETWS secondary notification and/or a CMAS notification. The bits 3-8 are not used currently, and shall be ignored by UE if received. Accordingly, a base station can transmit information for stopping or performing the paging monitoring operation described above to a UE using a short message.

Short messages may be transmitted on PDCCH using P-RNTI with or without associated paging message using short message field in DCI format (e.g., DCI format 1_0).

For convenience of description, the information for instructing the paging message monitoring operation in the PO (PDCCH monitoring occasions) of the UE as described above is discussed using an example of information for instructing stopping a monitoring operation in a specific PO (PDCCH monitoring occasions). This is merely for convenience of description, and may be information for instructing various operations of the UE described above. For example, the information for instructing the paging message monitoring operation may include at least one of information for instructing not to perform monitoring in an increased PO subsequent after corresponding information has been received, information for instructing not to perform monitoring in an increased PO subsequent to one paging DRX (a paging period), information for instructing not to perform monitoring in increased PDCCH monitoring occasions or at a set of PDCCH monitoring occasions subsequent to one paging DRX (a paging period), information for instructing to perform monitoring only in one PO in a paging DRX (a paging period), information for instructing to perform monitoring only in one PO (a first PO) when one or more POs are configured in a paging DRX (a paging period), information for instructing not to perform monitoring in a PO subsequent to a corresponding DRX cycle when one or more POs are configured in a paging DRX (a paging period), information for instructing to perform monitoring only in a first paging DRX (a normal paging DRX) when two paging DRXs (two paging periods) are configured, and information for instructing not to perform monitoring in a second paging DRX (a DRX paging period shorter than a normal paging DRX) when two paging DRXs (two paging periods) are configured.

The base station may provide, to the UE, information for instructing the UE not to perform monitoring in an increased PO (PDCCH monitoring occasions) using any bit (e.g., one of the remaining bits 3-8) in the short message.

For example, when one or more POs are configured in a paging DRX (a paging period) for a UE, even when there is no paging message to be transmitted to the UE in a first PO, the base station may transmit the information for instructing the UE not to perform monitoring in the increased PO (PDCCH monitoring occasions) described above. The UE that has received this information in the corresponding PO is able to identify that the base station has not failed to perform the LBT. Accordingly, the UE is able to identify that there is no pending paging message. When it has been identified that there is no pending paging message, the UE does not perform the monitoring operation in a PO ((PDCCH monitoring occasions) subsequent to the first PO of the POs configured in the paging DRX in which the corresponding information has been received. The UE performs the paging operation in a specific PO (e.g., a first PO) of a subsequent paging DRX.

For convenience of description and ease of understanding, a paging configuration with only one PO (a basic PO) per a DRX is referred to as a first paging configuration, and a paging configuration with one or more increased POs or a PO configured with an increased length per a DRX is referred to as a second paging configuration. When the UE receives the information for instructing the UE not to perform monitoring in an increased PO (PDCCH monitoring occasions), the UE dose not perform the paging monitoring operation in a subsequent increased PO (PDCCH monitoring occasions). In this case, the UE performs paging monitoring only in the basic PO according to the first paging configuration. Unlike this situation, when the UE has not received the information for instructing the UE not to perform monitoring in an increased PO (PDCCH monitoring occasions), the UE performs paging monitoring operation until succeeding in paging reception in one or more POs according to the second paging configuration. Alternatively, the UE may perform paging monitoring operation until receiving any identifiable information from a corresponding cell in one or more POs according to the second paging configuration.

Embodiment 2: A Method of Receiving Information for Implicitly Instructing Monitoring Operation Using a Radio Signal Unlike the separate explicit instruction as in the short message described above, a base station may transmit information for implicitly instructing a monitoring operation using a pre-defined radio signal to a UE.

For example, the base station may use a radio signal capable of identifying a serving cell as information for instructing the UE not to perform monitoring in an increased PO (PDCCH monitoring occasions). When a UE receives the radio signal capable of identifying a corresponding serving cell in a PO associated with the UE, the UE is able to identify that the base station has succeeded in the LBT in the corresponding PO. In order for the base station to transmit a radio channel on an unlicensed band, it is normally needed to succeed in performing the LBT. Accordingly, when the UE has detected a signal of the radio channel form the base station, the UE is able to identify that the LBT has not failed in a corresponding PO (PDCCH monitoring occasions), and that there is no paging message for the UE. For example, a reference signal may be served as that radio signal. Alternatively, a PDCCH scrambled with a RNTI except for the P-RNTI may be served as that radio signal.

Accordingly, the UE is able to identify, using such implicit signals, that there is no pending paging message for the UE. The UE may not perform paging monitoring in a subsequent increased PO (PDCCH monitoring occasions) in a paging DRX. The UE is able to perform the paging monitoring again in a PO in a subsequent paging DRX (e.g., a first PO).

When the UE receives information for instructing the UE not to perform monitoring in an increased PO (PDCCH monitoring occasions), the UE dose not perform the paging monitoring operation in the subsequent increased PO (PDCCH monitoring occasions). In this case, the UE performs the paging monitoring only in the basic PO according to the first paging configuration. When the UE has not received the information for instructing the UE not to perform monitoring in the increased PO (PDCCH monitoring occasions), the UE performs the paging monitoring operation until succeeding in paging reception in one or more POs (PDCCH monitoring occasions) according to the second paging configuration. Alternatively, the UE may perform the paging monitoring operation until receiving any identifiable information from a corresponding cell in one or more POs (PDCCH monitoring occasions) according to the second paging configuration.

For example, a reference signal received by a UE in an RRC idle or RRC inactive state through a corresponding cell in the PO may be served as an implicit signal received by a UE in an associated PO. The reference signal may be a signal, such as a DRS, a SSB, a DMRS, a CSI-RS, or the like, and information related to transmission timing of the reference signal may be indicated to the UE through a SIB or dedicated RRC signaling. That is, the reference signal may be served for implicitly indicating as the cell identification information or the information of instructing the UE not to perform the monitoring operation in a PO (PDCCH monitoring occasions) described above.

As another example, a newly defined radio signal received by a UE in an RRC idle or RRC inactive state through a corresponding cell in an associated PO may be served as an implicit signal received by the UE in the PO. Alternatively, configuration information for configuring the corresponding radio signal may be indicated to the UE through a SIB or dedicated RRC signaling. The configuration information may include at least one of a maximum duration of a radio signal; when the UE receives the radio signal, a paging DRX cycle using the radio signal, a starting/basic/one PO of the paging DRX cycle; when the UE has not received the radio signal, a duration of an increased PO, the number of POs, and a time gap/offset information up to an increased subsequent PO.

As further another example, a PDCCH or PDSCH signal scrambled with a RNTI other than the P-RNTI may be served as an implicit signal received by the UE in an associated PO.

According to the embodiments described above, the UE in the RRC idle or RRC inactive state performs paging monitoring in the basic PO according to the first paging configuration, and when not having received information for instructing the UE not to perform monitoring in an increased PO (PDCCH monitoring occasions), may perform monitoring in a subsequent increased transmission opportunity until succeeding in paging reception in an increased PO according to the second paging configuration (or until receiving corresponding information in the increased PO (PDCCH monitoring occasions) according to the second paging configuration.

When the UE receives information or a paging message for instructing not to perform monitoring in the increased PO (PDCCH monitoring occasions), paging monitoring may be performed in the basic PO according to the first paging configuration in a subsequent paging DRX.

A Method of Providing One or More Increased POs Through One or More Paging DRX Cycles As described above, there is a possibility of an LBT failure when a base station performs the LBT for performing the paging procedure. A paging DRX may be configured with a short period by a network as a method for compensating for reduced transmission opportunities due to the LBT failure. However, this may cause a paging load in the network to increase, and the power consumption of a UE to increase as the UE monitors paging transmission with a short period.

To address this, paging may be performed using one or more paging DRX values. For convenience of description, hereinafter, discussions are conducted on a situation where two paging DRX values are set. However, this is merely for ease of understanding, embodiments of the present disclosure are equally applicable to a situation where two or more DRX values are used. Hereinafter, for convenience of description, a first paging DRX is defined as having a normal paging DRX period, and a second paging DRX is defined as having a smaller value than the normal paging DRX. That is, the DRX cycle is classified into the first paging DRX and the second paging DRX, each of which has a different DRX period value from each other, and the second paging DRX is configured to have a smaller value than the first paging DRX.

In accordance with embodiments of the present disclosure, when two paging DRXs are used, a UE may perform a switching operation between two paging DRXs using information for instructing not to perform monitoring in an increased PO (PDCCH monitoring occasions) as described above.

When two paging DRXs are configured for a UE, the base station may transmit information for instructing the UE not to perform monitoring in an increased PO (PDCCH monitoring occasions) described above even when there is no paging message to be transmitted in a PO that belongs to the first paging DRX (paging period). The UE having received this in a PO of a PF configured in the first paging DRX is able to identify that the base station has not failed to perform the LBT. Accordingly, the UE is able to identify that there is no paging message for the UE. Accordingly, the UE is able to apply the first paging DRX in a subsequent paging period. Otherwise, when the UE has not received information for instructing not to perform monitoring in an increased PO (PDCCH monitoring occasions), the UE may perform paging monitoring in a PF with a smaller paging period according to the second paging DRX. That is, when the UE has not received a paging message from the base station, and when the UE has not received information for instructing not to perform monitoring in an increased PO (PDCCH monitoring occasions), the UE may switch the DRX period to the second paging DRX taking into an LBT failure of the base station account.

Meanwhile, when configuring the first paging DRX and the second paging DRX, the base station may configure the second paging DRX having a smaller paging period not to overlap a PF of another UE. To do this, the base station may configure the second paging DRX by defining information on a radio frame offset value or the number of repeated radio frames in a pre-configured PF as a new information element. That is, it is possible to avoid overlapping a PF in the second paging DRX configuration with a PF of other UE(s) by adding a radio frame offset value or an additional offset value to the pre-configured first paging DRX configuration.

As described above, an RRC idle or RRC inactive UE may perform paging monitoring in a PO of the basic PF according to the first paging DRX, and when not having received information for instructing not to perform monitoring in an increased PO (PDCCH monitoring occasions), the RRC idle or RRC inactive UE perform the paging monitoring in an increased PF (or a smaller paging DRX period) according to the second paging DRX in a subsequent PF (subsequent paging DRX cycle).

When the UE receives information or a paging message for instructing not to perform monitoring in an increased PO (PDCCH monitoring occasions), the UE is able to perform paging monitoring in a PO of the basic PF according to the first paging DRX in a subsequent PF (subsequent paging DRX cycle).

In accordance with embodiments or examples described above, a UE may reduce power consumption required for paging message monitoring in an unlicensed band or a licensed band. In addition, a base station may take more opportunities for transmitting a paging message to a UE in an unlicensed band or a licensed band.

Hereinafter, structures of a UE and a base station capable of performing the embodiments or examples described above will be discussed again with reference to the drawings.

Figure 15:
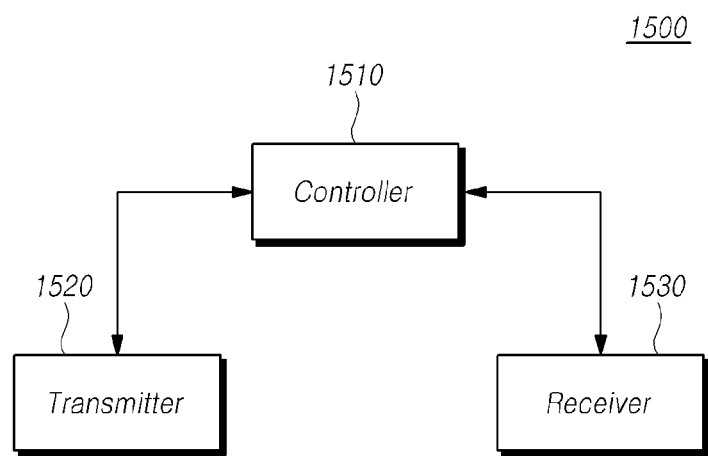
FIG. 15 is a diagram illustrating a user equipment according to embodiments of the present disclosure.

FIG. 15 is a diagram illustrating a UE according to embodiments of the present disclosure.

Referring to FIG. 15, a UE 1500 performing a paging operation may include a receiver 1530 configured to receive extended PDCCH monitoring occasion indication information, and a controller 1510 configured to monitor whether a paging message is present at a set of PDCCH monitoring occasions included in a paging occasion, and when it is detected that a base station has accessed to a channel including a frequency band to which the paging message is transmitted at one or more of the PDCCH monitoring occasions, stopping the monitoring for whether the paging message at the set of PDCCH monitoring occasions is present.

For example, the controller 1510 monitors whether a paging message for the corresponding UE 1500 is present at a set of PDCCH monitoring occasions of a paging occasion (PO) configured in the DRX cycle. Specifically, the controller 1510 may monitor, by performing blind decoding, whether a signal scrambled with a paging radio network temporary identifier (P-RNTI) is present at the PDCCH monitoring occasions.

The set of PDCCH monitoring occasions is configured by 'M' repetitions of 'S' consecutive PDCCH monitoring occasions. Here, the S denotes the number of actual transmitted SSBs determined based on a system information block, and the M may be set to a natural number of 1 or more. That is, the set of PDCCH monitoring occasions is configured with one or more PDCCH monitoring occasions. Further, the set of PDCCH monitoring occasions may be configured by M repetitions of S PDCCH monitoring occasions.

If a paging occasion is not configured with extended PDCCH monitoring occasions, the set of the paging monitoring occasions is configured with S consecutive PDCCH monitoring occasions. Unlike this, if the extended PDCCH monitoring occasions are configured, the set of the paging occasions is configured with M repetitions of S consecutive PDCCH monitoring occasions, that is, configured with S*M PDCCH monitoring occasions.

Meanwhile, the M value may be received from a base station by being included in extended PDCCH monitoring occasion indication information. The extended PDCCH monitoring occasion indication information may include the M value, and the receiver 1530 may receive it through high layer signaling. Alternatively, the extended PDCCH monitoring occasion indication information may be broadcast through system information. If the M value is set to 1, or the extended PDCCH monitoring occasion indication information is not received, the controller 1510 configures and monitors a set of PDCCH monitoring occasions with S consecutive PDCCH monitoring occasions.

The controller 1510 may determine or detect whether the base station has accessed the corresponding channel at one or more of the PDCCH monitoring occasions. For example, the frequency band of the corresponding channel may be a licensed band or an unlicensed band. As an example, in the case of the unlicensed band, the controller 1510 may determine or detect whether the base station has accessed the channel including the corresponding frequency band through successful occupation after having performed the LBT or the like. As another example, in the case of the licensed band, the controller 1510 may determine or detect whether the base station has accessed the channel by determining or detecting whether the base station transmits a signal in the corresponding frequency band.

As an example, when the controller 1510 receives a demodulation reference signal (DMRS) transmitted from the base station at the set of PDCCH monitoring occasions, the UE determines that the base station has accessed a channel of a frequency band over which the paging message is transmitted. As another example, when the controller 1510 detects a PDCCH transmitted from the base station at the set of PDCCH monitoring occasions, the UE determines that the base station has accessed a channel of a frequency band over which the paging message is transmitted. Here, the PDCCH may include a signal scrambled with another RNTI except for the P-RNTI. As further another example, when the UE receives a signal scrambled with the P-RNTI at the set of PDCCH monitoring occasions, the UE is able to determine that the base station has accessed the channel.

Meanwhile, when it is determined or detected that the base station has accessed a channel including a frequency band of the set of PDCCH monitoring occasions, the UE is able to stop monitoring a paging message at one or more subsequent PDCCH monitoring occasions. Specifically, it is assumed that a set of PDCCH monitoring occasions is configured with a total of 4 PDCCH monitoring occasions, from index 0 to index 3. In this case, the UE monitors whether a paging message scrambled with the P-RNTI at PDCCH monitoring occasions from PDCCH monitoring occasion #0 to PDCCH monitoring occasion #3 is received. If it is determined or detected that the base station has accessed a channel at PDCCH monitoring occasion #1, the UE stops monitoring for detecting a paging message at PDCCH monitoring occasion #2 and PDCCH monitoring occasion #3.

This paging message monitoring stopping operation may be applied to only a discontinuous reception (DRX) cycle including a paging occasion in which it is determined or detected that the base station has accessed a channel. That is, the paging message monitoring stopping operation in accordance with embodiments of the present disclosure is applied to only a corresponding DRX cycle and does not affect into a subsequent DRX cycle.

In addition, the controller 1510 controls the overall operation of the UE 1500 to prevent undesired power consumption of the UE 1500 in an increased PO needed for performing the embodiments or examples described above.

In addition, a transmitter 1520 and the receiver 1530 are configured to transmit or receive signals, messages, data required to perform embodiments described above to or from the base station.

Figure 16:
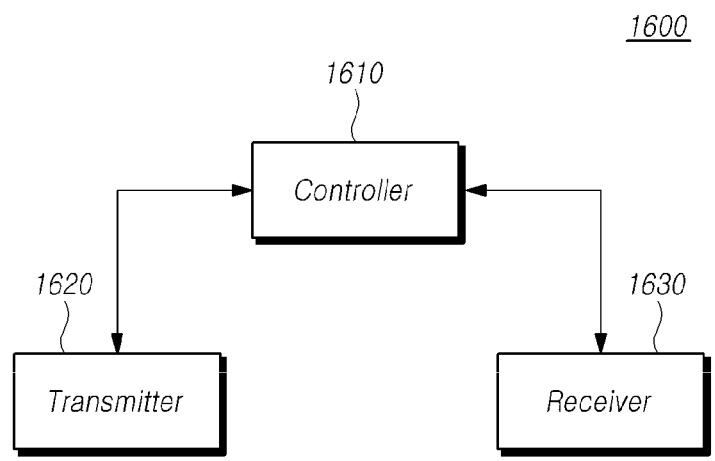
FIG. 16 is a diagram illustrating a base station according to embodiments of the present disclosure.

FIG. 16 is a diagram illustrating a base station according to embodiments of the present disclosure.

Referring to FIG. 16, a base station controlling a paging operation of a UE may include a controller 1610 configured to configure extended PDCCH monitoring occasion indication information, and a transmitter 1620 configured to transmit the extended PDCCH monitoring occasion indication information to the UE and transmit a reference signal or a PDCCH at a set of PDCCH monitoring occasions included in a paging occasion, which is configured using the extended PDCCH monitoring occasion indication information. Here, the UE monitors whether a paging message is present at the set of PDCCH monitoring occasions and stops the monitoring for whether the paging message is present when the reference signal or the PDCCH is detected.

The transmitter 1620 transmits indication information for indicating extended PDCCH monitoring occasions to the UE. For example, the set of PDCCH monitoring occasions may be configured with M repetitions of S consecutive PDCCH monitoring occasions. Here, the S denotes the number of actual transmitted SSBs determined based on a system information block. The M value may be transmitted by being included in extended PDCCH monitoring occasion indication information. The PDCCH monitoring occasion indication information may be transmitted through high layer signaling or system information.

When the set of extended PDCCH monitoring occasions is not configured for the UE, the extended PDCCH monitoring occasion indication may be set to 1 or may not be transmitted.

For example, a frequency band over which the reference signal or the PDCCH is transmitted may be a licensed band or an unlicensed band.

As an example, when data transmission is triggered for the corresponding UE, the transmitter 1620 transmits a paging message for the UE in a PO in a paging DRX cycle of the UE. For example, the transmitter 1620 may transmit, over PDCCH, a signal scrambled with the P-RNTI at the set of PDCCH monitoring occasions. In this case, the UE receives a paging message through paging message monitoring.

As another example, the transmitter 1620 transmits a reference signal, such as the DMRS, at the set of PDCCH monitoring occasions of the UE. The UE monitors whether a paging message is present at the set of PDCCH monitoring occasions and stops the monitoring for whether the paging message is present when the reference signal is detected.

As further another example, the transmitter 1620 transmits a PDCCH scrambled with a radio network temporary identifier (RNTI) except for the P-RNTI (paging-RNTI) at the set of PDCCH monitoring occasions of the UE. The UE monitors whether a paging message is present at the set of PDCCH monitoring occasions and stop the monitoring for whether the paging message is present when the PDCCH scrambled with the RNTI except for the P-RNTI is detected.

In addition, the controller 1610 controls the overall operation of the base station 1600 to prevent undesired power consumption of the UE in an increased PO needed for performing the embodiments or examples described above.

In addition, the transmitter 1620 and the receiver 1630 are configured to transmit or receive signals, messages, data required to perform embodiments or examples described above to or from the UE.

The embodiments described above may be supported by the standard documents disclosed in at least one of the radio access systems such as IEEE 802, 3GPP, and 3GPP2. That is, the steps, configurations, and parts, which have not been described in the embodiments, may be supported by the above-mentioned standard documents for clarifying the technical concept of the disclosure. In addition, all terms disclosed herein may be described by the standard documents set forth above.

The above-described embodiments may be implemented by any of various means. For example, the embodiments may be implemented as hardware, firmware, software, or a combination thereof.

In the case of implementation by hardware, the method according to the embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for performing a paging operation, the method comprising:
    monitoring whether a paging message is present at a set of physical downlink control channel (PDCCH) monitoring occasions included in a paging occasion and wherein the set of PDCCH monitoring occasions is configured by M repetitions of S consecutive PDCCH monitoring occasions, where the S indicates a number of transmitted synchronization signal blocks determined based on a system information block, and the M is a natural number equal to or greater than 1;
    determining whether a base station has accessed to a channel including a frequency band over which the paging message is transmitted at the set of PDCCH monitoring occasions; and
    when it is determined that the base station has accessed to the channel, stopping the monitoring for whether the paging message is present at the set of PDCCH monitoring occasions.

2. The method according to claim 1, wherein the M value is received from the base station by being included in extended PDCCH monitoring occasion indication information.

3. The method according to claim 1, wherein the frequency band over which the paging message is transmitted is an unlicensed band.

4. The method according to claim 1, wherein the determining of whether the base station has accessed to the channel comprises:
    determining that the base station has accessed the channel when detecting a reference signal or a PDCCH scrambled with a radio network temporary identifier (RNTI) except for a paging-RNTI (P-RNTI) transmitted by the base station at the set of PDCCH monitoring occasions.

5. The method according to claim 1, wherein the stopping of the monitoring for whether the paging message is present comprises:
    stopping the monitoring only in a discontinuous reception (DRX) cycle in which the paging occasion is included.

6. A method of a base station for controlling a paging operation of a user equipment (UE), the method comprising:
    transmitting extended physical downlink control channel (PDCCH) monitoring occasion indication information to the UE; and
    transmitting a reference signal or a PDCCH at the set of PDCCH monitoring occasions included in a paging occasion and configured using the extended PDCCH monitoring occasion indication information, wherein the set of PDCCH monitoring occasions is configured by M repetitions of S consecutive PDCCH monitoring occasions, where the S indicates a number of transmitted synchronization signal blocks determined based on a system information block, and the M is a natural number equal to or greater than 1, and
    wherein the UE monitors whether a paging message is present at the set of PDCCH monitoring occasions and stops the monitoring for whether the paging message is present when the reference signal or the PDCCH is detected.

7. The method according to claim 6, wherein the frequency band over which the reference signal or the PDCCH is transmitted is an unlicensed band.

8. The method according to claim 6, wherein the PDCCH is scrambled with a radio network temporary identifier (RNTI) except for a paging-RNTI (P-RNTI).

9. A user equipment (UE) for performing a paging operation, the user equipment comprising:
a receiver configured to receive extended physical downlink control channel PDCCH monitoring occasion indication information; and
a controller configured to monitor whether a paging message is present at a set of PDCCH monitoring occasions included in a paging occasion, and stop the monitoring for whether the paging message at the set of PDCCH monitoring occasions is present when detecting that a base station has accessed to a channel including a frequency band over which the paging message is transmitted at one or more of the PDCCH monitoring occasions, wherein the set of PDCCH monitoring occasions is configured by M repetitions of S consecutive PDCCH monitoring occasions, where the S indicates a number of transmitted synchronization signal blocks determined based on a system information block, and the M is a natural number equal to or greater than 1.

10. The user equipment according to claim 9, wherein the M value is included in the extended PDCCH monitoring occasion indication information.

11. The user equipment according to claim 9, wherein the frequency band over which the paging message is transmitted is an unlicensed band.

12. The user equipment according to claim 9, wherein the controller determines that the base station has accessed the channel when a reference signal or a PDCCH scrambled with a radio network temporary identifier (RNTI) except for a paging-RNTI (P-RNTI) transmitted by the base station at the set of PDCCH monitoring occasions is detected.

13. The user equipment according to claim 9, wherein the controller is configured to stop the monitoring for whether the paging message is present only in a discontinuous reception (DRX) cycle in which the paging occasion is included.

* * * * *